United States Patent
Chen

(10) Patent No.: US 7,437,924 B2
(45) Date of Patent: Oct. 21, 2008

(54) WIND VANE DEVICE

(76) Inventor: Fu-Liang Chen, 2nd Fl., No. 18, Lane 36, Minquan Road, Yonghe City, Taipei County (TW) 23453

( * ) Notice: Subject to any disclaimer, the term of this patent is extended or adjusted under 35 U.S.C. 154(b) by 0 days.

(21) Appl. No.: 11/804,152

(22) Filed: May 17, 2007

(65) Prior Publication Data
US 2008/0053214 A1   Mar. 6, 2008

(30) Foreign Application Priority Data
Sep. 6, 2006   (TW) ............................... 95132807 A

(51) Int. Cl.
*G01W 1/00* (2006.01)
(52) U.S. Cl. ................. 73/170.05; 73/170.01
(58) Field of Classification Search .. 73/170.01–170.15
See application file for complete search history.

(56) References Cited

U.S. PATENT DOCUMENTS

| 3,220,253 | A | * | 11/1965 | Parker | 73/170.07 |
| 5,361,633 | A | * | 11/1994 | Peet, II | 73/170.08 |
| 5,469,738 | A | * | 11/1995 | Hendrickson | 73/170.07 |
| 5,639,963 | A | * | 6/1997 | Sustare, Jr. | 73/170.08 |

FOREIGN PATENT DOCUMENTS

TW   M244449   10/1992

* cited by examiner

*Primary Examiner*—Edward Lefkowitz
*Assistant Examiner*—Jermaine Jenkins
(74) *Attorney, Agent, or Firm*—Bucknam and Archer

(57) ABSTRACT

A wind vane device comprises a horizontal portion that can swivel by the propeller blades provided at one end, a vertical portion with one end attached to the bottom of the horizontal portion and the other end extending downwardly, a supporting frame supporting the horizontal portion at the lower side of the vertical portion, wherein the vertical portion is cylindrical and has a plurality of radial partitioning walls at inner side in the axial direction; an upright shaft having an axle 51 with thread portions at both ends, one end of which is fastened to the center of the partitioning wall and the other end provided with a pair of bearings, a bearing sleeve being put around the outside of the pair of bearings; wherein the supporting frame consists of several sections of supporting rods. An engageable and disengageable structure is formed between a supporting rod and a supporting rods through a connector. The upper end located at the supporting rod of top-section engages at the outside of the bearing sleeve. In this manner, a structure easy for assembling/disassembling and transporting can be obtained.

19 Claims, 5 Drawing Sheets

WIND VANE DEVICE

BACKGROUND OF THE INVENTION

1. Field of the Invention

The present invention relates to a wind vane device, more particularly to a large-sized wind vane device with DIY structure that is easy in assembling/disassembling and transportation thereof.

2. Brief Description of the Prior Art

Conventionally, a Taiwanese Patent No. M244449 entitled "Improved Device for a Wind Vane with Pattern", as shown in FIG. 10, mainly comprises: a base (11'); a round tube (12') supported at the center of the upper side of the base (11'), an orientation indicating plate (13') being provided at the outside of the upper end of the round tube (12'), a plug having a V-shape recess being inserted in the inside at the top end of the orientation indicating plate (13'); a main shaft (14'),the lower end of which is acute, which is positioned in the V-shape recess to swivel; a disk (15'), the center of which is fixed on the top of the main shaft (14') by a bow-shape support (16'); a cup set (17'), which is rotatably supported through a shaft at a fixed point on the disk face of the disk (15'); and a weathercock with pattern design (18') attached to the upper end of the bow-shape support (16').

The structure disclosed in the above patent of is suitable for a compact structure with the elements fixed by weld, and will not induce any trouble in transportation and installation after manufacturing in factory. However, as to a large-sized wind vane device, for example the wind vane device for observing the exhaust gas emission at factory site, or the wind vane device for collecting meteorological data, especially the large-sized wind vane device with a height over 3 meters, the volume of the device is too huge so that the transportation and installation suffers from lots of difficulty, time-consuming and arduous. It is, to some extent, unsatisfactory in use, therefore improvement thereof is expected. The inventor of the present invention, considering that the components in the large-sized wind vane device should have a DIY structure of easiness in assembling/disassembling, and of detachable capability to cause downsizing for easy transportation.

SUMMARY OF THE INVENTION

The main object of this invention is to provide a large-sized vane device with a height over 3 meters, in which the components is easy to assemble/disassemble and to detach to cause downsizing for easy transportation so that the defects in prior art can be removed.

In order to achieve the above objects, the wind vane device of the present invention comprises:

a horizontal portion, having a cylindrical structure with a pattern design, which includes: a radial partition plate provided internally at the front end; and a central shaft, one end of which is fixed at the center of the partition plate and the other end of which has a protruding shaft extending forwardly; a bearing received in a bearing jacket and between the bearing jacket and a cover, the bore of the bearing being journaled on the protruding shaft, and a nut threaded at the outer end of the protruding shaft, the cover having a flange portion at the outer circumference; and a nose portion, which clamps and fixes one end of a plurality of blades of a propeller onto the flange of the cover. In this manner, the propeller is rotatable relative to the stationary protruding shaft, and thus to the horizontal portion upon the blowing of wind, and the wind vane device has a structure with easiness in assembling/disassembling among components.

According to this invention, the wind vane device of the present invention comprises: a vertical portion, one end of which being fixed to the bottom of the horizontal portion, the other end extending downward, a supporting frame supporting the horizontal portion at the lower side of the vertical portion, wherein the vertical portion is cylindrical and has a plurality of radial partitioning walls at inner side in the axial direction;

an upright shaft having an axle, one end of which is threaded into the center of the partitioning wall and the other end provided with a pair of bearings, a bearing sleeve being put around the outside of the pair of bearings. In this manner, a swiveling mechanism is formed between the blades and the horizontal portion, that is able to swivel following with the wind speed, and the wind vane device has a structure with easiness in assembling/disassembling between components.

Further, the wind vane device of the present invention comprises a support frame composed of several sections of support rods, in which a connector is used for the connection between two support rods to form a structure enabling assembling and disassembling. A positioning pin is provided at the upper end and a plurality of engaging holes are provided on the lower end of the bearing jacket. A positioning groove and a plurality of engaging holes are correspondingly formed at the top end of the top support rod so that the engagement is conducted at the outside of the bearing jacket. A plurality of retaining ring are provided on the top support rod for the anchorage of cables. In this way, the vertical portion and the horizontal portion are kept at a predetermined height by the support frame, and a structure with easiness in assembling/disassembling between components is obtained.

DETAILED DESCRIPTION OF THE PREFERRED EMBODIMENTS

The technical features of the present invention will become more apparent by the detailed description of following embodiments, which are merely illustrative rather than restrictive on the scope of the present invention, in conjunction with the attached drawings.

Figure 1:
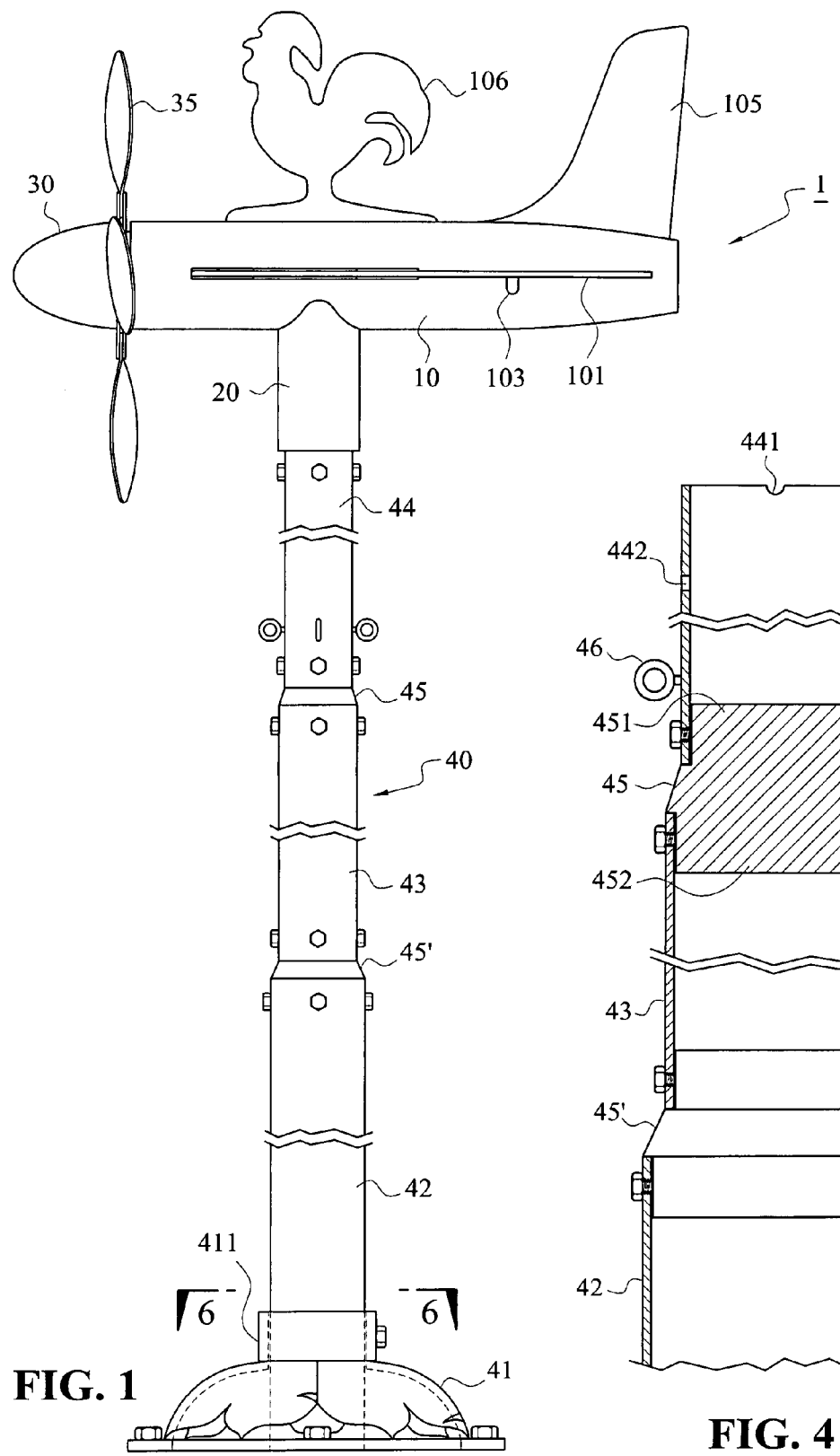
FIG. 1 is a schematic view showing an embodiment of the wind vane device of the present invention.

FIGS. 1 to 7 shows an embodiment of the wind vane device 1 of the present invention. The wind vane device 1 of this embodiment essentially comprises a horizontal portion 10, that can swivel by a plurality of blades 35 provided at one end, a vertical portion 20 with one end attached to the bottom of the horizontal portion 10 and the other end extending downwardly, a supporting frame 40 supported at the lower side of the vertical portion 20 (as shown in FIG. 1).

Figure 2:
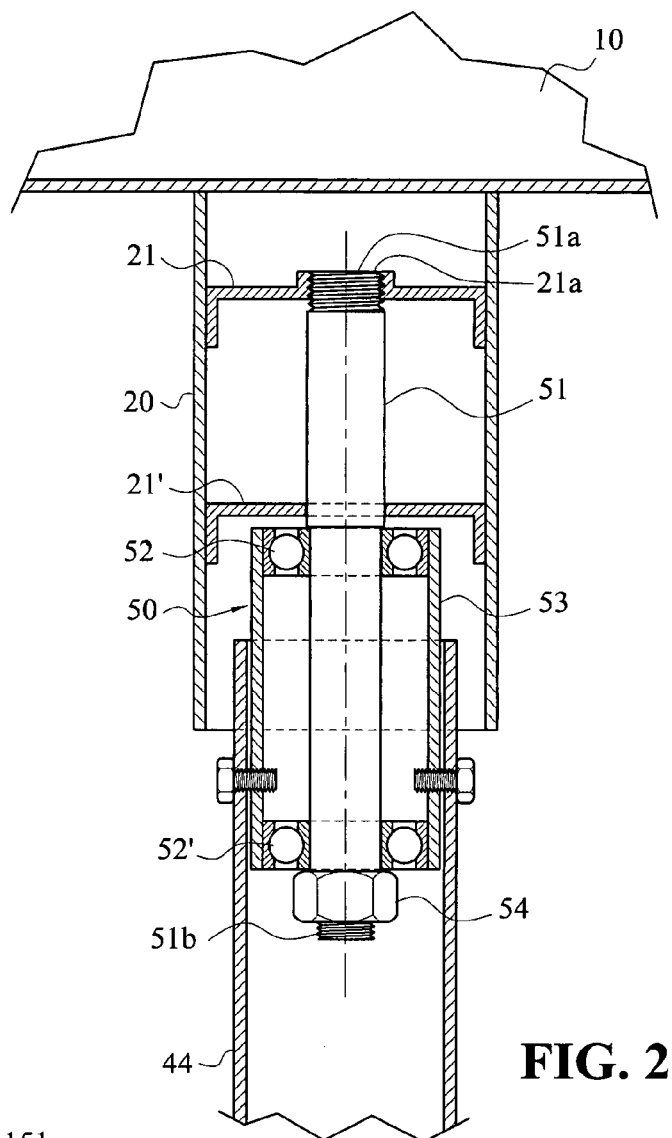
FIG. 2 is a partial sectional view showing the wind vane device of the present invention, in which the associated relationship of the vertical shaft and the other members is shown.

Referring to FIG. 2, the vertical portion 20 is a cylindrical structure and has a plurality of radial partitioning walls 21,21' at the inner side in the axial direction. A suitable distance is maintained between the partition wall 21 and the partition wall 21'. The upper partition wall 21 has a center hole 21a tapped with thread at the inner diameter. An upright shaft 50 has an axle 51 with thread portions at both ends, one end of which is fastened to the center of the partitioning wall 21 after passing through the partition wall 21', and the other end of which is provided with a pair of bearings 52, 52', a suitable distance being maintained between the bearing 52 and the bearing 52'. A bearing sleeve 53 is put around the outside of the pair of bearings 52, 52'. A nut 54 serving as a stopper is engaged at the lower end 51b of the axle 51 in such a manner that a swiveling mechanism capable of swiveling to align with the wind direction is formed between the upright shaft 50 and the vertical portion 20.

Figure 3:
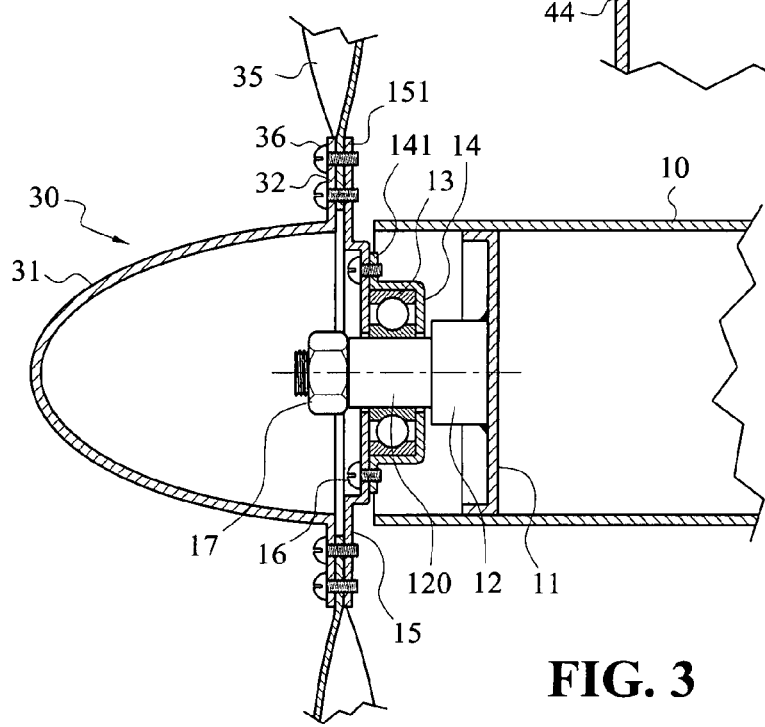
FIG. 3 is a partial sectional view showing the wind vane device of the present invention, in which a schematic view of the nose and the blades of the propeller is shown.
Figure 5:
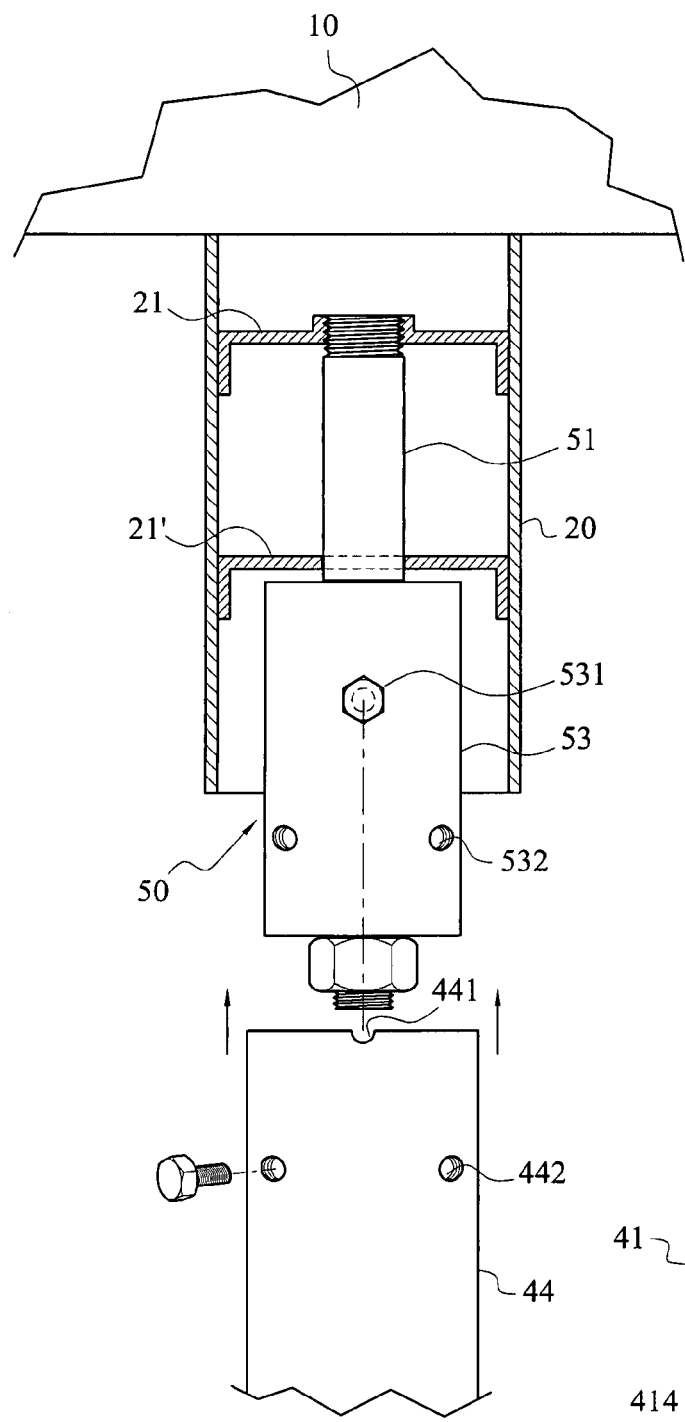
FIG. 5 is a schematic view showing the fixation and the connection between the vertical shaft and the support frame of the present invention.

As shown in FIG. 3, the horizontal portion 10 is a cylindrical structure which comprises:

a radial partition plate 11 provided internally at the front end, a central shaft 12, one end of which is fixed at the center of the partition plate 11 and the other end of which has a protruding shaft 120 extending forwardly, a bearing 13 received in a bearing jacket 14, the center bore of which is fitted on the journal of the protruding shaft 120, a peripheral edge portion 141 being extended at outside of the bearing jacket 14, a cover 15, having a cap portion and a flange portion 151, the peripheral edge portion 141 of the bearing jacket 14 being fastened on the cap portion of the cover 15 by a plurality of bolts 16, a nut 17, threaded on the outside end of the protruding shaft 120 to function as a restriction portion, and a radial nose portion 30, having a cone-shape projecting portion 31 at one end and a flange portion 32, which is fastened with the flange portion 151 of the cover 15, at the other end, a plurality of blades 35 of an propeller, one ends of which are sandwiched between the flange portion 32 and the flange portion 151 and are fastened firmly together by bolts 36, the nose portion 30 together with the propeller forming a integral rotatable mechanism which can rotate at a speed in correspondence to the wind speed.

Figure 4:
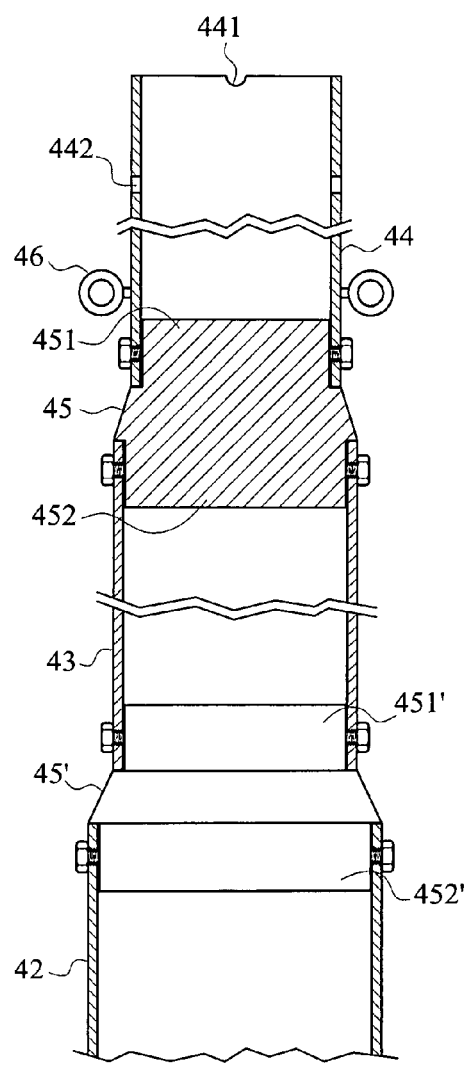
FIG. 4 is a schematic sectional view of the support frame of the wind vane device of the present invention .
Figure 6:
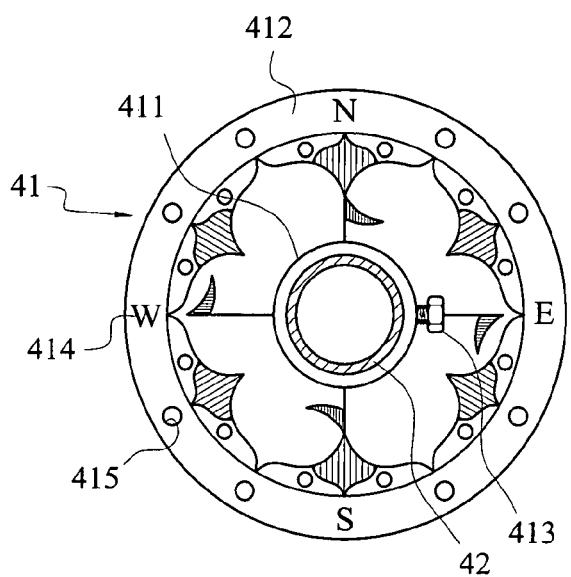
FIG. 6 is a cross sectional view taken along the line 6-6 in FIG. 1.

Referring to FIG. 4, the support frame 40 is formed by several sections of support rods 42, 43, 44. A connector 45 is used to connect releasably between the support rods 42 and 43, and a connector 45' of different size is used to connect between the support rods 43 and 44. When viewed as a whole, the diameters of each of the support rods 42, 43, 44 have stepwise shrinkage from lower to upper direction. The upper portion of each connector 45 and 45' has a small-diameter part 451, 451', and the lower portion has a large-diameter part 452, 452'. Each diameter part conforms to the inner diameter of the corresponding portion of the inner diameter of the portion of the support rods 42, 43, 44 to be connected. The upper end of the top-section support rod 44 is fitted with the outside of the bearing sleeve 53. A plurality of holes 532 are provided at fixed location of the upper end of the bearing sleeve 53, and a plurality of holes 442 are correspondingly provided at the top portion of the top-section support rod 44. In order that the holes 442 on the top-section support rod 44 can be aligned with the holes 532 on the vertical portion 50, the alignment of a pin 531 and a corresponding groove 441 for positioning, which are provided on the upper end of the bearing sleeve 53 and the top end of the top-section support rod 44 respectively, is conducted first so as to result in the automatic alignment between the holes 442 and 531. Further, a plurality of retaining rings 46 are provided on the top-section support rod 44 for the anchorage of cables (not shown in Figures). Additionally, as shown in FIG. 6, the bottom end of the bottom section of support rod 42 is supported on the ground through a parachute-shape base 41. A sleeve 411 provided at the center of the base 41 extends upwardly for the insertion of the support rod 42 which is fastened by a bolt 413 for fixation. A plurality of holes 415 are provided on the annular edge portion 412 extended from the bottom of the base 41. During the installation of the wind vane device, the plural holes 415 are aligned and fastened by nuts with corresponding plural bolts, which are embedded into ground in advance. Four orientation marks of "E,W,S,N" are disposed respectively at four equally distributed positions on the annular edge portion 412. Thus, the wind vane device can be installed in such a way that the orientation marks are aligned with the natural orientations.

Figure 8:
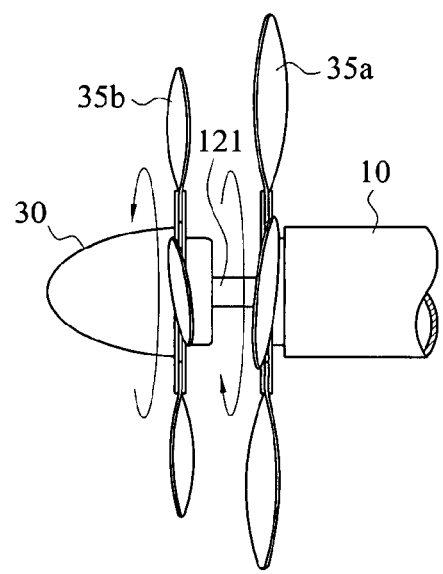
FIG. 8 is a schematic view showing another embodiment of the wind vane device of the present invention.
Figure 9:
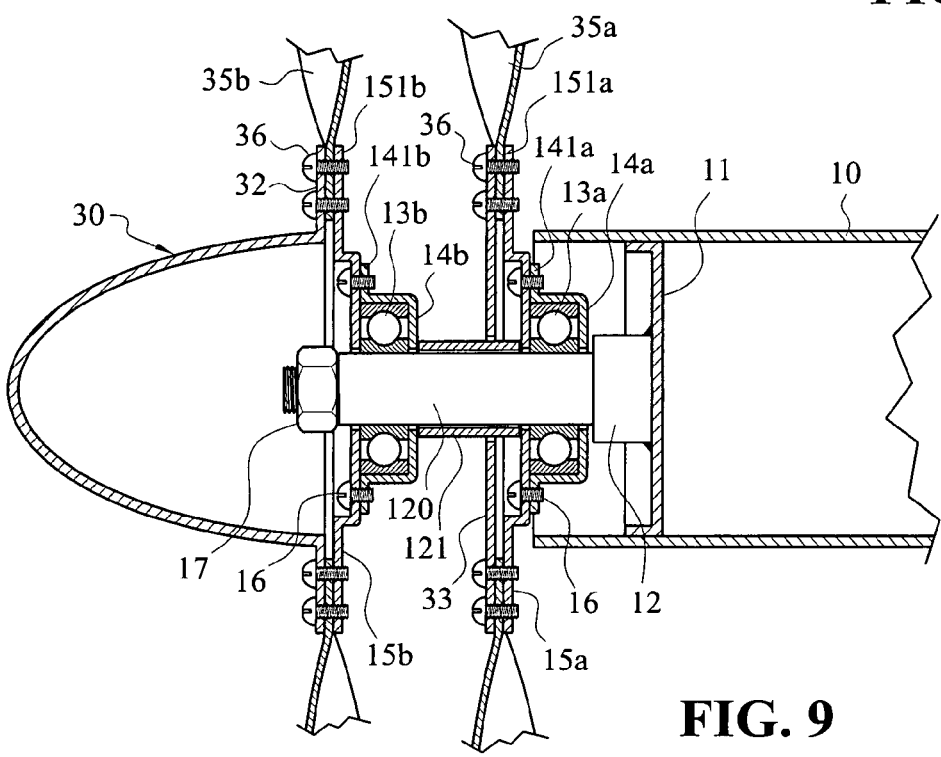
FIG. 9 is a sectional enlarged view of FIG. 8.
Figure 10:
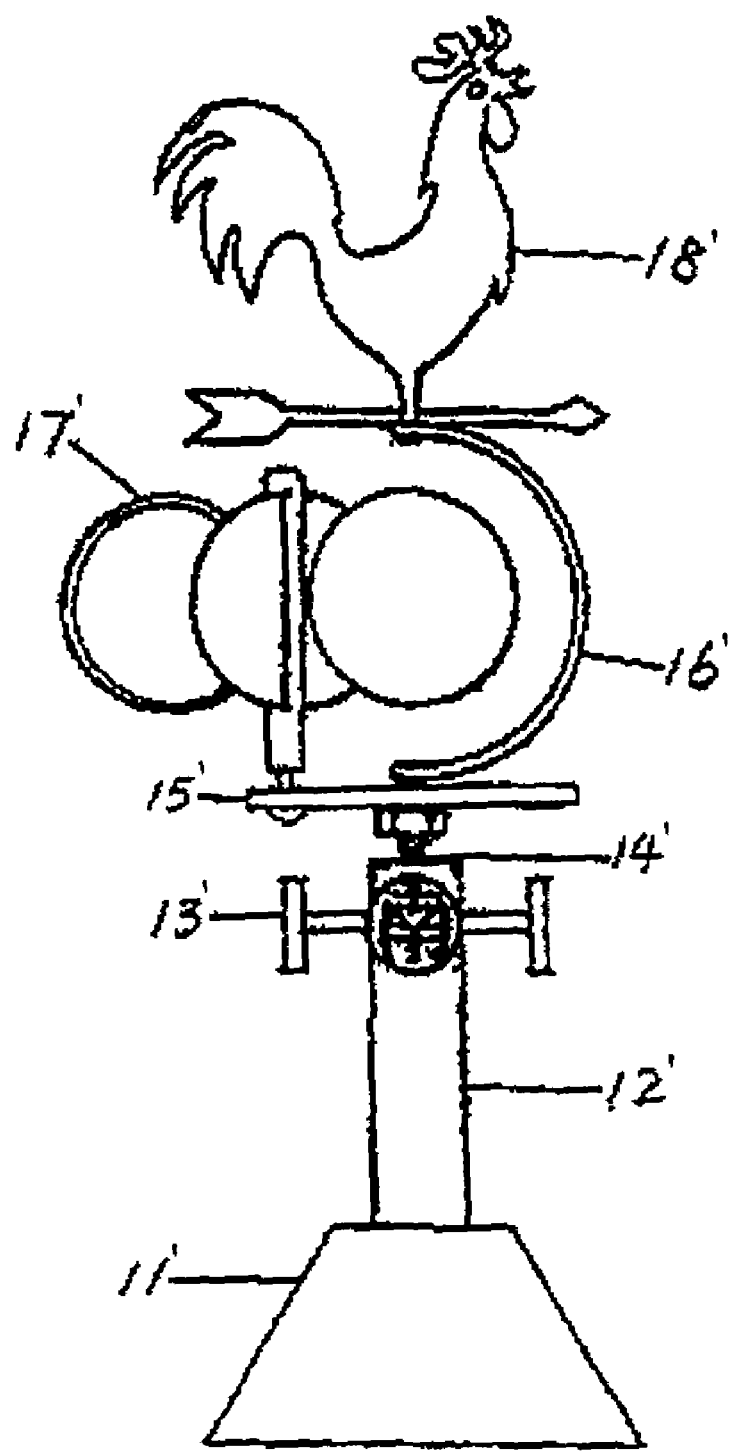
FIG. 10 is a schematic view showing a prior art of Taiwanese Patent No. M244449 entitled "Improved Device for the Structure of a Wind Vane Device with Pattern".

FIGS. 8 and 9 shows another embodiment of the wind vane device according to the present invention. The configuration of this embodiment is basically the same as that of the above embodiment, except that two set of blades 35a, 35b are arranged in the axial direction at the front end of the horizontal portion 10, and two sets of blades 35a, 35b rotate mutually in opposite directions. As shown in FIG. 9, a pair of bearings 13a and 13b are accepted in the first bearing jacket 14a and a second bearing jacket 14b respectively. The pair of bearings 13a and 13b are journaled on the protruding shaft 120 at the front end of the horizontal portion 10 in the axial direction. The bearing jacket 14a, 14b are provided with peripheral edge portion 141a, 141b at outside perimeter respectively. A spacer bushing 121 is inserted at the outer periphery of the protruding shaft 120 and between the pair of bearing jacket 14a, 14b. A pair of covers, namely the first cover 15a and the second cover 15b each has a cap portion and a flange portion 151a, 151b respectively. The peripheral edge portion 141a, 141b of the bearing jacket 14a, 14b are each fastened on the cap portion of the cover 15a, 15b by a plurality of bolts 16. A nut 17 is threaded on the outside end of the protruding shaft 120 to form a restriction portion.

Further, a clamping plate 33 cooperates with the flange portion 151a of the first cover 15a to clamp the blades (propeller) 15a by fastening means, such as bolts and nuts. A radial nose portion 30 has a cone-shape projecting portion 31 at one end and a flange portion 32 at the other end. The flange portion 32 is fastened with the flange portion 151b of the second cover 15b. The first propeller 35a is formed by a plurality of blades, one end of which are sandwiched between the clamping plate 33 and the flange portion 151a of the first cover 15a. The clamping plate 33, the blades of the first propeller 35a, and the flange portion 151a are fastened together by a plurality of threaded fasteners 36. Similarly, the second propeller 35b is formed by a plurality of blades, one end of which are sandwiched between the flange portion 32 of the nose portion 30 and the flange portion 151b of the second cover 15b. The flange portion 32, the blades of the second propeller 35b and the flange portion 151b are fastened together by a plurality of threaded fasteners 36. In this way, the first propeller 35a and the second propeller 35b each forms a rotatable mechanism which can rotate independently with each other at a speed corresponding to the wind speed. The radial length of the blades of the second propeller 35b is designed to be shorter than that of the blades of the first propeller 35a, preferably length of the blades of the second propeller 35b is about ⅔ the length of the first propeller 35a, so that the gas stream will not completely blocked by the second propeller 35b. Besides, the angle of attack of the blades of the first propeller 35a is designed to be opposite to that of the second propeller 35b, so that the first propeller 35a and the second propeller 35b will rotate in opposite directions. This will generate relatively unique visual effect.

Figure 7:
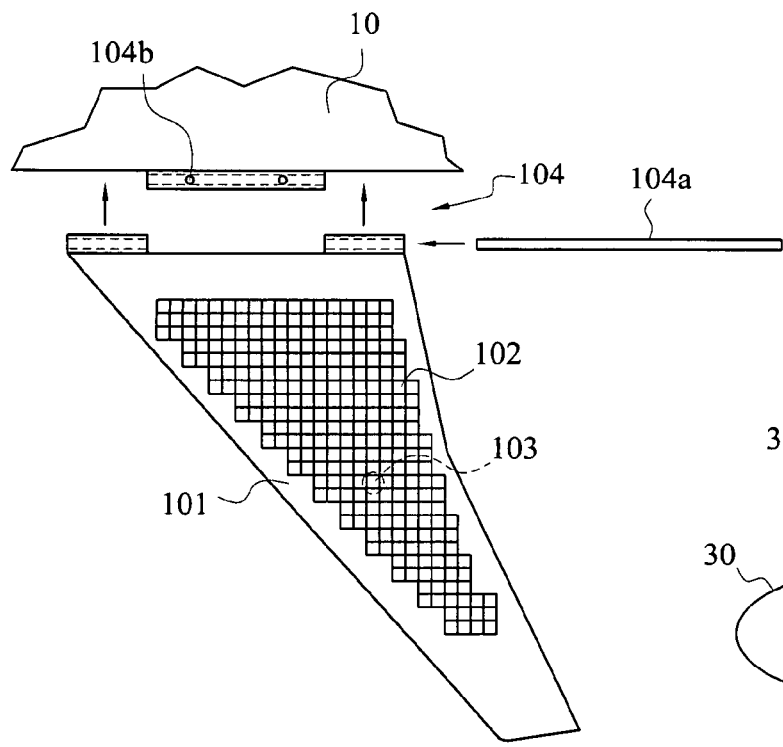
FIG. 7 is a plan view showing the wing of the present invention.

According to the wind vane device 1 of the present invention, the horizontal portion 10 is permitted to have diversified ornamental design variations. For example, a rudder 105 can be provided at the tail end and/or a pair of wings 101 can be provided at both sides of the horizontal portion 10 to present an airplane appearance for the purpose of fun and enhancement on visual effect. Furthermore, a lot of solar cell 102 can be provided on the top surface, and LED lamp sets 103 can be arranged on the bottom surface of the wings 101 (as shown in FIG. 7) to emit flickering light itself at night. Additionally, time and/or temperature display can be installed so display the time and temperature on time. An ornamental pattern 106, such as an animal weathercock is provided at the top of the center of the horizontal portion 10. For the sake of convenience in assembling/disassembling and transportation, as shown in FIG. 7, the pair of wings 101 and the horizontal portion 10 can be connected with each other by hinges 104 and latch pins 104a to form a foldable structure which can reduce the volume of the device. The pair of wings 101 can be fixed in place by the threaded bolts through the tap holes 104b on the hinge 104 onto the pins 104a. In this manner, a wind vane device having DIY structure with easiness in assembling/disassembling and transportation.

Furthermore, a person skilled in the art can understand that the wind vane device of the present invention can be connected with a data acquiring module so as to acquire such data as wind speed, wind direction etc. at specified unit time interval without any difficulty.

The above embodiments has been described for the illustrative purpose only, not for the restriction of the scope of the present invention. The equivalent modifications and variations made without departing from the spirit and principle of the present invention are considered to be still within the scope of the present invention.

What is claimed is:
1. A wind vane device (1), comprising:
a horizontal portion (10), having a plurality of blades (35) provided at an end of the horizontal portion (10) to swing the horizontal portion (10) freely according to the wind direction,
a vertical portion (20), one end of which being fixed to the bottom of the horizontal portion (10), the other end extending downwardly,
a supporting frame (40), supporting the horizontal portion (10) at the lower side of the vertical portion (20),
wherein the vertical portion (20) is a cylindrical structure and has a plurality of radial partitioning walls (21, 21') at inner side in the axial direction;
an upright shaft (50) for housing an axle (51) with threaded portions at both ends, one end of the axle (51) is fastened to the center of the partitioning wall (21) and the other end of the axle (51) is provided with a pair of bearings (52, 52'), a bearing sleeve (53) being put around the outside of the pair of bearing (52, 52'),
the supporting frame (40) consisting of several support rods (42, 43, 44) in which connectors (45, 45') are used for the connection between two adjacent support rods to form a structure enabling the assembling/disassembling, and the upper end of the top-section support rod (44) being engaged at the outside of the bearing sleeve (53).

2. A wind vane device (1) according to claim 1, wherein an appropriate distance is maintained between the partitioning wall (21) and (21') of the vertical portion (20), a threaded center hole (21a) being provided at the upper partitioning wall (21), the upper end (51a) of the axle (51) of the upright shaft (50) being threaded into the center hole (21a), an appropriate distance being maintained between the bearing (52) and the bearing (52'), and a nut (54) being threaded at the lower end (51b) of the axle (51).

3. A wind vane device (1) according to claim 2, wherein a positioning pin (531) is provided at the upper end of the bearing sleeve (53) and a plurality of engaging holes (532) are provided at the lower end of the bearing sleeve, correspondingly a positioning groove (441) for engaging with the pin (531) and a plurality of engaging holes (442) being formed on the top end of the top-section support rod (44).

4. A wind vane device (1) according to claim 3, wherein the upper portion of the connector (45, 45') has a small-diameter part (451, 451') and the lower portion has a large-diameter part (452, 452'), the diameter of each part conforming to the inner diameter of the corresponding portion of the support rods (42, 43, 44) to be connected.

5. A wind vane device (1) according to claim 4, wherein a plurality of retaining ring are provided on the top-section support rod (44) for the anchorage of cables.

6. A wind vane device (1) according to claim 5, wherein the bottom end of the bottom-section support rod (42) is supported on ground through a parachute-shape base (41), a sleeve (411) at the center of the base (41) being provided for the insertion of the support rod (42) which is fastened by a bolt (413) on the sleeve (411) for fixation, an annular edge portion (412) extending from the bottom of the base (41).

7. A wind vane device (1) according to claim 6, wherein orientation marks (414) of "E,W,S,N" are disposed respectively at four equally distributed positions on the annular edge portion (412) of the base (41).

8. A wind vane device (1) according to claim 7, wherein the horizontal portion (10) is a cylindrical structure comprising: a radial partition plate (11) provided internally at the front end; and a central shaft (12), one end of which is fixed at the center of the partition plate (11) and the other end of which has a protruding shaft (120) extending forwardly.

9. A wind vane device (1) according to claim 8, wherein the horizontal portion (10) further comprises a bearing (13) received in a bearing jacket (14), the center bore of which is fitted on the journal of the protruding shaft (120), a peripheral edge portion (141) being provided at the outside of the bearing jacket (14), a cover (15) having a cap portion and a flange portion (151), the peripheral edge portion (141) of the bearing jacket (14) being fastened on the cap portion of the cover (15) by a plurality of bolt (16), a nut (17) being threaded on the outside end of the protruding shaft 120.

10. A wind vane device (1) according to claim 9, wherein the horizontal portion (10) further comprises:
a nose portion (30) having a cone-shape projecting portion (31) at one end and a flange portion (32), which is fastened with the flange portion (151) of the cover (15), at the other end; and
a plurality of blades (35) of a propeller, in which one ends of the blades (35) are sandwiched between the flange portion (32) and the flange portion (151) and are fastened firmly together by a plurality of threaded fasteners (36).

11. A wind vane device (1) according to claim 8, wherein the horizontal portion (10) has a pair of bearings (13*a*) and (13*b*) accepted in the first bearing jacket (14*a*) and a second bearing jacket (14*b*) respectively, the pair of bearings (13*a*) and (13*b*) being journaled on the protruding shaft (120) at the front end of the horizontal portion (10) in the axial direction, peripheral edge portions (141*a*, 141*b*) being provided at the outside perimeter of the bearing jacket (14*a*, 14*b*) respectively, a spacer bushing (121) being inserted at the outer periphery of the protruding shaft (120) and between the pair of bearing jacket (14*a*, 14*b*), the first cover (15*a*) and the second cover (15*b*) formed as a pair each having a cap portion and a flange portion (151*a*, 151*b*) respectively, each of the peripheral edge portions (141*a*, 141*b*) of the bearing jacket (14*a*, 14*b*) being fastened on the cap portion of the cover (15*a*, 15*b*) by a plurality of bolts (16), a nut (17) being threaded on the outside end of the protruding shaft (120) to serve as a restriction.

12. A wind vane device (1) according to claim 11, wherein the horizontal portion (10) further comprises:

- a clamping plate (33) cooperating with the flange portion (151*a*) of the first cover (15*a*) to clamp the blades (35*a*) by fastening means,
- a nose portion (30) having a cone-shape projecting portion (31) at one end and a flange portion (32), which is fastened with the flange portion (151*b*) of the second cover (15*b*), at the other end,
- a first propeller (35*a*) having a plurality of blades, one end of which are sandwiched between the clamping plate (33) and the flange portion (151*a*) of the first cover (15*a*), the clamping plate (33), the blades of the first propeller (35*a*), and the flange portion (151*a*) being fastened together by a plurality of threaded fasteners (36),
- a second propeller (35*b*) having a plurality of blades, one end of which are sandwiched between the flange portion (32) of the nose portion (30) and the flange portion (151*b*) of the second cover (15*b*), the flange portion (32), the blades of the second propeller (35*b*) and the flange portion (151*b*) being fastened together by a plurality of threaded fasteners (36).

13. A wind vane device (1) according to claim 10, wherein the horizontal portion (10) is formed as an airplane pattern design.

14. A wind vane device (1) according to claim 13, wherein the horizontal portion (10) is provided with a pair of wings (101) at both sides, on the top surface of which is provided with a lot of solar cell (102), on the bottom surface of which is provided with LED lamp sets (103).

15. A wind vane device (1) according to claim 14, wherein the pair of wings (101) and the horizontal portion (10) are connected with each other by hinges (104) and latch pins (104*a*) to form a foldable structure.

16. A wind vane device (1) according to claim 15, wherein the horizontal portion (10) is provided with a rudder (105) at the tail end thereof.

17. A wind vane device (1) according to claim 15, wherein an ornamental pattern weathercock (106) is provided at the top of the center of the horizontal portion (10).

18. A wind vane device (1) according to claim 12, wherein the blades of the second propeller (35*b*) is designed to be shorter than that of the blades of the first propeller (35*a*) preferably the length of the blades of the second propeller (35*b*) is about ⅔ that of the first propeller (35*a*).

19. A wind vane device (1) according to claim 18, wherein the direction of rotation of the first propeller (35*a*) is opposite to that of the second propeller (35*b*).

* * * * *